United States Patent Office 2,872,495
Patented Feb. 3, 1959

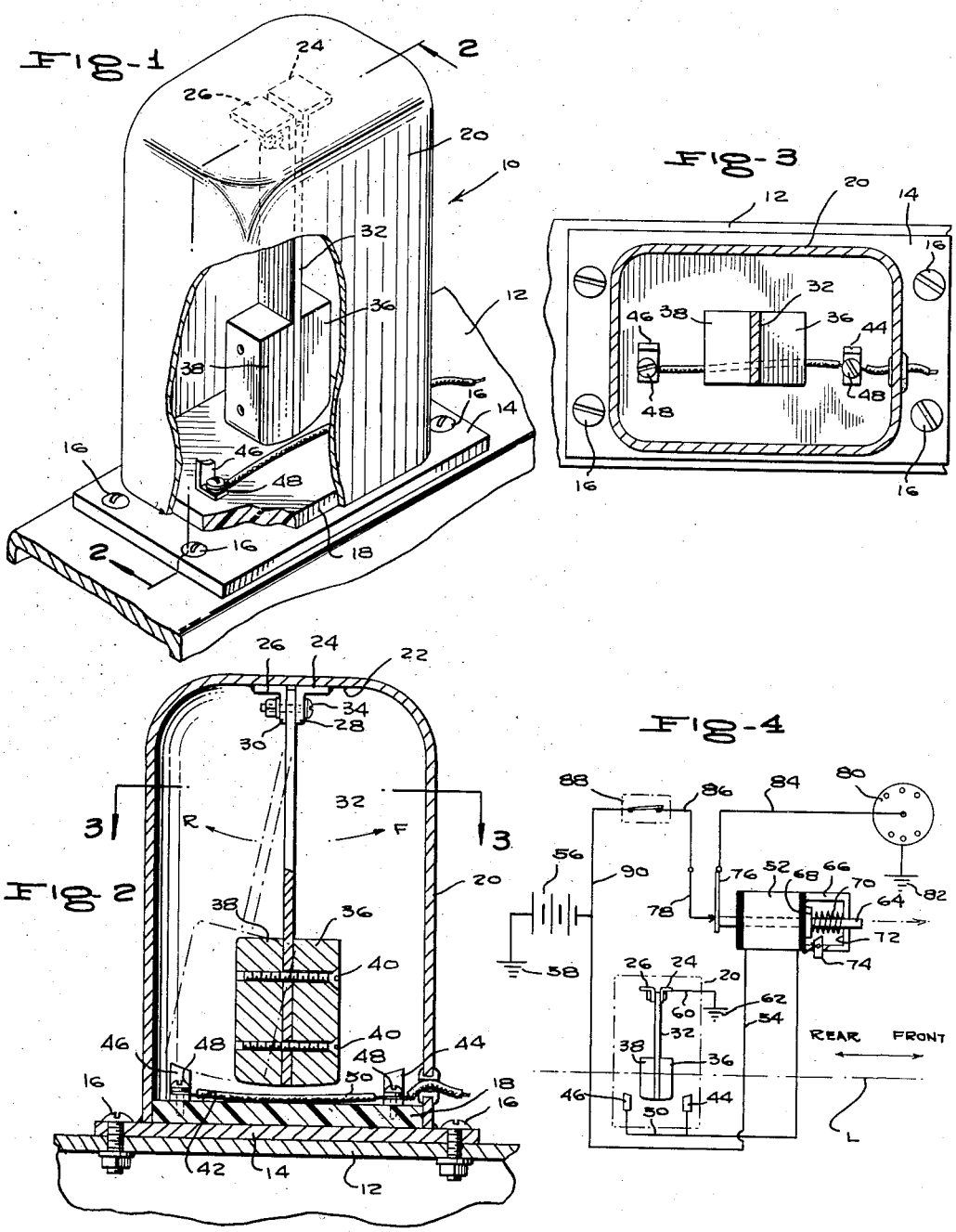
Feb. 3, 1959  C. R. BURGESS  2,872,495
COLLISION SAFETY SWITCH
Filed Jan. 31, 1956
INVENTOR.
CHARLES ROSS BURGESS
BY
Samuel Meerbreeba
ATTORNEY

2,872,495

COLLISION SAFETY SWITCH

Charles Ross Burgess, Toronto, Ontario, Canada; The Royal Trust Company, Elizabeth K. Burgess and Ralph E. Burgess, executors of said Charles R. Burgess, deceased Application January 31, 1956, Serial No. 562,573

3 Claims. (Cl. 123—146.5)

This invention relates generally to ignition cut-out systems, and is more particularly concerned with a novel switch mechanism in an ignition cut-out system incorporating an inertia switch actuated by a sudden collision of a vehicle in which it is installed, the ignition cut-out system being equally adaptable and effective in aircraft, for example, when making forced landings.

A decided hazard during collisions or accidents of the character mentioned is the igniting of fuel fumes by an activated ignition system, said ignition system normally not being cut out during the sudden occurrence of the collision, for example.

A primary object of invention is to overcome the shortcomings and dangers of conventional ignition systems incorporating in an ignition system a control circuit actuated by a novel inertia-type switch.

A further object of invention in conformance with that set forth above is to provide an ignition cut-out system incorporating an inertia activated contact or pendulum which is operative during a collision from either the front or the rear of a vehicle to close a control circuit actuating a manual reset relay which opens switch mechanism incorporated in an ignition system of a vehicle whereby the relay must be manually reset before the ignition system will function to permit the engine of the vehicle to be restarted.

Another object of invention is conformance with that set forth above is to provide an ignition cut-out system of the character involved which includes an inertia actuated switch mechanism which is readily and economically manufactured, easily installed and maintained, and highly serviceable, practical and utilitarian for the purpose intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the novel inertia actuated safety collision switch, with portions broken away and shown in section for clarity;

Figure 2 is a sectional view taken substantially on line 2—2 of Figure 1;

Figure 3 is a sectional view taken substantially on line 3—3 of Figure 2; and

Figure 4 is a diagrammatic view of an ignition circuit and control circuit in conjunction with the inertia actuated switch mechanism in its relative position with respect to the longitudinal axis of a vehicle in which it will be installed.

Referring to the drawings, the novel inertia or safety switch is indicated generally at 10, said switch being mounted on a suitable horizontal mounting flange 12 located in any convenient position on a vehicle, the switch incorporating a mounting plate 14 suitably apertured for receiving mounting bolts 16 therethrough, said bolts extending into suitable aperture portions in the flange 12. The mounting plate 14 has suitably secured thereon a plate member 18 of any suitable electrical insulating material such as Bakelite, and a suitable support member or housing member 20 is suitably secured on the mounting plate 14, by means of welding, for example.

Secured on an upper inner surface portion 22 of the housing 20 in depending relationship therefrom are a pair of oppositely disposed angle bracket elements 24 and 26, said bracket elements having one leg suitably secured to the under surface portion 22 of said housing member and having right angular leg portions 28 and 30, respectively, disposed in parallel relationship to each other, said legs 28 and 30 including oppositely disposed aligned transverse bore portions extending therethrough. A resilient leaf spring element 32 has an upper transversely apertured end portion extending between the legs 28 and 30 and is fixedly secured therebetween by means of a suitable nut and bolt assembly 34. Secured to the lower end of the leaf spring 32 are a pair of oppositely disposed weight elements 36 and 38, said weight elements 36 and 38 having transverse aligned bore portions which are in alignment with suitable transverse aperture portions in the lower intermediate portion of the leaf spring 32, the weight elements 36 and 38 being retained on said leaf spring element 32 by means of suitable securing screws 40.

Considering the direction arrows labeled F and R, referring to front and rear, respectively, when a vehicle has a collision when moving forward, the force of inertia will be effective to move the weight elements and the leaf spring 32 in the direction indicated by the direction arrow F thus constituting an inertia actuated switch means as will subsequently become apparent. Of course, when the vehicle is moving rearwardly and has a collision, or is struck suddenly from the rear, the pendulum or weights 36 and 38 will move in the direction indicated by the direction arrow R.

Suitably secured on the upper surface portion 42 of the plate 18 is a pair of spaced electrical conducting elements 44 and 46 which are in substantial parallel alignment with the longitudinal axis of the vehicle in which the system is mounted, said axis being indicated generally at L in Figure 4, the contact elements 44 and 46 being disposed in the pivotal path of the weight elements 36 and 38, respectively, said elements 36 and 38 being of a material which will readily conduct an electrical current. The elements 44 and 46 are suitably secured to the plate 18 by means of suitable fastening elements 48.

The contact elements 44 and 46 are connected in series to an electrical conducting wire 50 which in turn is connected to one side of a solenoid coil 52, a second lead from the solenoid coil is indicated at 54, being connected to a suitable source of potential such as the battery 56 which is suitably grounded at 58 to the vehicle chassis, as is conventional in single line electrical systems of passenger vehicles, for example. An electrical conducting wire 60 is suitably connected to the leaf spring element 32, the conducting wire 60 being suitably grounded at 62 for the purpose of completing or activating the electrical circuit in response to actuation of the solenoid 52 as will become apparent. Thus the previously mentioned movement forward or rearward of the weight elements due to the force of inertia on the weight elements will result in the activation of the solenoid 52 for a purpose to be described.

The solenoid coil 52 is suitably mounted on the vehicle and includes a solenoid-actuated armature rod 64 reciprocably supported in a suitable housing member 66, said rod 64 having a circumposed annular flange portion 68 which is in engagement with one end of a compression spring 70, the other end of said spring being in engagement with an inner surface portion 72 of the member 66. A spring urged dog or latch element 74 is suitably mounted on the housing 66 and when the solenoid coil 52 is activated, the rod 64 will be urged toward the right in the direction indicated by the direction arrow in Figure 4 whereby the annular flange 68 will be retained in the rightward position by the dog element 74. When this occurs, an electrical contact element 76 is moved away from a contact element 78 resulting in the shorting out of a distributor coil 80 forming a part of the vehicle ignition system. The vehicle ignition system includes in addition to the distributor coil 80 which is grounded at 82, an electrical conducting wire 84 suitably connected to the contact element 76. The contact element 78 is connected by means of a suitable conducting wire 86 to an ignition switch 88 which in turn is connected by means of an electrical conducting wire 90 to the source of potential 56.

Thus there has been disclosed an inertia actuated switch mechanism in conjunction with a control circuit which readily and expeditiously cuts out a vehicle ignition system for the safety purposes mentioned, the heretofore described structure fully conforming with the objects of invention as heretofore set forth.

Various positional directional terms such as "lower," "inner," etc. are utilized herein to have only a relative connotation to aid in describing the device and it is not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An ignition cut-out safety system comprising a collision actuated switch assembly, a control circuit connected to said switch assembly, solenoid-operated relay switch means in said control circuit operated in response to activation of said collision actuated switch assembly, an ignition circuit, and switch means in the ignition circuit controlled by said solenoid-operated relay switch means whereby said ignition circuit is deactivated in response to activation of said collision actuated switch assembly due to an inertia force resulting from a collision, said solenoid-operated relay switch means including a manually operable latch positively maintaining said relay switch means open in the ignition circuit, said collision actuated switch assembly comprising at least one electrical contact element disposed in the control circuit, a support member disposed in overlying relationship to said one electrical contact element, a depending leaf spring member displaceably supported on said support member in alignment with said one electrical contact element for momentary engagement therewith, said leaf spring member being electrically connected to said control circuit for activating the same when engaging the contact element, electrically-conducting inertia-responsive weight means on a lower portion of said leaf spring member whereby the force of inertia on the weight means during a collision momentarily closes the control circuit, activating the relay switch means and deactivating the ignition circuit.

2. An ignition cut-out safety system comprising a collision actuated switch assembly, a control circuit connected to said switch assembly, solenoid-operated relay switch means in said control circuit operated in response to activation of said collision actuated switch assembly, an ignition circuit, and switch means in the ignition circuit operated by said relay switch means whereby said ignition circuit is deactivated in response to activation of said control circuit when said collision actuated switch assembly is activated due to an inertia force resulting from a collision, said relay switch means including a manually operable latch positively maintaining said relay switch means open in the ignition circuit, said collision actuated switch assembly comprising a pair of spaced electrical contact elements in said control circuit, a support member disposed in overlying relationship to the contact elements, a depending spring member displaceably supported on said support member in alignment with said electrical contact elements and momentarily engageable therewith, said electrical contact elements being connected in series in said control circuit for activating the control circuit when the collision actuated switch assembly is activated, inertia responsive weight means on a lower portion of the leaf spring member and constructed to conduct an electrical current therethrough whereby the force of inertia on the weight means during a collision momentarily closes the control circuit, activates said relay switch means and deactivates said ignition circuit.

3. An inertia actuated collision switch for momentarily activating a control circuit comprising a pair of spaced electrical contact elements for connection in series in a control circuit, an elongated leaf spring electrical conducting element displaceably supported for movement between the contact elements and engageable therewith for momentarily energizing the control circuit, and inertia responsive weight means on a lower portion of the leaf spring contact element and normally maintained by the leaf spring contact element out of engagement with said spaced electrical contact elements in the circuit, whereby the force of inertia during a collision momentarily urges the leaf spring contact element into circuit enclosing relationship with one of said pair of spaced electrical contact elements in said control circuit.

References Cited in the file of this patent

UNITED STATES PATENTS

| | | |
|---|---|---|
| 1,708,265 | Freeman | Apr. 9, 1929 |
| 2,075,040 | Kieber | Mar. 30, 1937 |
| 2,262,917 | Brooks | Nov. 18, 1941 |